US012748124B2

(12) United States Patent
Knobloch et al.

(10) Patent No.: US 12,748,124 B2
(45) Date of Patent: Sep. 29, 2026

(54) METHOD FOR OFFSET COMPENSATION FOR SENSOR SIGNALS, OFFSET COMPENSATION DEVICE AND SENSOR DEVICE

(71) Applicant: Continental Automotive Technologies GmbH, Hannover (DE)

(72) Inventors: Anselm Knobloch, Frankfurt am Main (DE); Frank Michel, Rosbach v.d. Höhe (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 276 days.

(21) Appl. No.: 18/699,273

(22) PCT Filed: Apr. 28, 2022

(86) PCT No.: PCT/DE2022/200080
§ 371 (c)(1),
(2) Date: Apr. 6, 2024

(87) PCT Pub. No.: WO2023/057013
PCT Pub. Date: Apr. 13, 2023

(65) Prior Publication Data

US 2024/0426861 A1 Dec. 26, 2024

(30) Foreign Application Priority Data

Oct. 7, 2021 (DE) .................... 10 2021 211 337.0

(51) Int. Cl.
*G01P 3/44* (2006.01)
*B60T 17/22* (2006.01)

(52) U.S. Cl.
CPC ................ *G01P 3/44* (2013.01); *B60T 17/22* (2013.01)

(58) Field of Classification Search
None
See application file for complete search history.

(56) References Cited

U.S. PATENT DOCUMENTS 5,260,975 A * 11/1993 Saito .................... H04L 1/0001 329/346
5,296,855 A 3/1994 Matsuzaki
(Continued)

FOREIGN PATENT DOCUMENTS

DE 4002549 A1 8/1991
DE 19537361 A1 4/1997
(Continued)

OTHER PUBLICATIONS

Reasons for Refusal dated Feb. 26, 2025 for the counterpart Japanese Patent Application 2024-520909 and machine translation of same.

(Continued)

*Primary Examiner* — Suman K Nath

(57) ABSTRACT

An offset compensation device, a sensor device and a method for offset compensation for sensor signals are described. The offset compensation device comprises a shift register containing elements in a number, an averaging unit and a low-pass filter. The method involves storing sensor values in the shift register, calculating a difference between the first element of the shift register and the last element of the shift register, determining multiple mean values, determining the lowest signal level using the low-pass filter, determining the offset by calculating the difference between the lowest signal level and a reference current value, and correcting the sensor values using the determined offset. Determining the mean values comprises starting averaging when the difference between the first element of the shift register and the last element of the shift register is greater (Continued)

than a threshold value, and stopping when the difference is less than the threshold value.

10 Claims, 7 Drawing Sheets

(56) References Cited

U.S. PATENT DOCUMENTS

| | | | | |
|---|---|---|---|---|
| 5,808,822 | A | 9/1998 | Kurachi | |
| 7,369,637 | B1 | 5/2008 | Mauer | |
| 9,369,266 | B1 * | 6/2016 | Khor | H04L 7/033 |
| 2006/0015243 | A1 | 1/2006 | Trapasso | |
| 2010/0066423 | A1 * | 3/2010 | Inukai | G01P 15/125 327/163 |
| 2014/0100741 | A1 | 4/2014 | Szepessy | |
| 2015/0215142 | A1 * | 7/2015 | Shibata | H04L 27/142 375/319 |

FOREIGN PATENT DOCUMENTS

| | | | |
|---|---|---|---|
| DE | 102018222791 | A1 | 6/2019 |
| JP | S52104143 | A | 9/1977 |
| JP | S53118581 | U | 9/1978 |
| JP | H10206453 | A | 8/1998 |
| JP | 2016512328 | A | 4/2016 |
| KR | 100468863 | B1 | 1/2005 |

OTHER PUBLICATIONS

German Search Report dated Jul. 21, 2022 for the prioirty German Patent Application No. 10 2021 211 337.0 and translation of same.
The International Search Report and the Written Opinion of the International Searching Authority mailed on for the counterpart PCT Application No. PCT/DE2022/200080.
Korean Office Action dated Mar. 20, 2026 for the counterpart Korean Patent Application No. 10 2024 7009608 and machine translation of same.

* cited by examiner

METHOD FOR OFFSET COMPENSATION FOR SENSOR SIGNALS, OFFSET COMPENSATION DEVICE AND SENSOR DEVICE

TECHNICAL FIELD

The embodiments described herein relate to a method for offset compensation for sensor signals, an offset compensation device, and a sensor device for sensors used with an automotive vehicle.

BACKGROUND

Analysis and correction of incorrect signals from sensors, in particular wheel speed sensors (WSSs) in electronic braking systems is a concern for automotive vehicles. Signals from WSSs are modulated onto the positive and negative terminals of the power supply of the WSSs in the form of current level transitions or defined current pulses.

WSS signals are essentially subject to two categories of causes of error. Internal sensor errors (that is to say errors on the sensor element itself) are usually caused by electrical or mechanical influences on the sensor element. Defective sensor elements can immediately cause an incorrect WSS signal. Errors in the transmission channel of the WSS signal (caused for example by environmental influences, aging, mechanical disturbances, etc., and the channel isolation) can also immediately cause an incorrect WSS signal.

WSS signals are usually conditioned (acquired and processed) by an analog signal interface, which is the electrical link between the WSS and a microcontroller (MCU). This signal interface is responsible for ensuring the integrity of the signal transmission between the WSS and the MCU. For this purpose, measures are put in place within the analog signal interface to gauge the state of the WSS transmission channel.

Known technologies for checking the WSS transmission channel can be divided in this case into two fundamentally different measurement methods. Invasive measurement methods convert the transmission channel between the WSS and the analog signal interface into a defined state, which is as interference-free as possible, during the measurement process. This requires the signal transmission between the WSS and the signal interface to be decoupled. The electrical parameters of the transmission channel are then gauged under known external electrical conditions. Non-invasive measurement methods are performed by analyzing the WSS signal itself. This allows conclusions to be drawn about the state of the signal channel or the state of the WSS itself.

Error patterns are manifested by a shift (offset) and/or a compression (attenuation) of the original WSS waveform. In order to detect the incorrect state early, the signal interface must provide a measuring device that examines the signal-carrying nodes for causes of signal errors. Depending on the measurement technology, the sensors cannot be operated during the measurement period, which is why measurement takes place outside of safety-critical periods. For vehicles, this usually means that the measurement process takes place immediately after the ignition is operated and when the vehicle is at a standstill.

In the case of invasive measurement methods, particularly the interruption of signal transmission between the WSS and the analog signal interface has an adverse effect. Due to safety demands on the WSS signal chain, this prevents error detection while driving.

SUMMARY

A method and a device by means of which signal errors in the signal transmission chain between the sensor and the analog signal interface can be detected and compensated for without interruption is provided.

A method for offset compensation for sensor signals by means of an offset compensation device is provided. The offset compensation device comprises a shift register containing elements in a number N, an averaging unit and a low-pass filter. The method involves the following steps storing sensor values in the shift register, calculating the difference between the first element of the shift register and the last element of the shift register, determining multiple mean values, determining the lowest signal level by means of the low-pass filter based on the mean values, determining the offset by calculating the difference between the lowest signal level and a reference current value, and correcting the sensor values by means of the determined offset. The mean values are determined by starting the averaging by the averaging unit if the difference between the first element of the shift register and the last element of the shift register is greater than a threshold value, and stopping the averaging if the difference is less than the threshold value A non-invasive measurement method is thus provided. As a result of the purely digital implementation, the method is robust and exhibits a predictable response. As technology advances, implementation of the method becomes cheaper (scaling effects). There is a quality improvement using the method as a result of high test coverage in production, as digital tests are automated. The method provides compensation for tolerances of analog circuit parts.

Even if the signal and the sampling times are uncorrelated, a well chosen sampling rate guarantees that the computed amplitude corresponds to the signal amplitude following use of the shift register. The computed amplitude is determined by the calculation of the difference between the first and last elements of the shift register.

The low-pass filter is used to mitigate the influence of a single averaging. If the averaging is carried out successfully multiple times, the output of the low-pass filter delivers the value of the lowest signal level.

In a development, the reference current value of the signal to be examined is set to 7 mA. This is relevant for commercially used variants of WSS that have a current flow of 7 mA as a basic level (for pulsed or three-level sensors) or as a low level (for standard two-level sensors). The variance between the measured value and the reference current value yields the determined offset.

In a development, a number for the shift register is chosen such that at least all samples of an edge can be stored and the number is greater than two.

In an alternative further development, the window of the averaging unit is chosen such that it is longer than the phases having the lowest level in the protocol, with the result that the averaging takes place after the protocol. A protocol involves each magnetic pole triggering a complete sequence of sensor pulses. These pulses have a defined length and contain further information about the sensor status. A protocol sensor thus sends a defined pulse sequence. The pauses between the protocols are determined by the wheel speeds.

In a development, the window of the averaging unit is chosen such that it is shorter than the phases having the lowest level in the protocol, with the result that the averaging is completed multiple times during a protocol. This achieves a more robust and accurate result. As few transmitted protocols as possible are lost, as the correction value can appear much more quickly.

In a development, the following steps are carried out: supplying at least one sensor with a voltage by way of an evaluation circuit, modulating a sensor current by way of the sensor, and measuring and evaluating the sensor current by way of the evaluation circuit.

In a development, the evaluation circuit has a high-side path and a low-side path and the following steps are carried out: using the high-side path and the low-side path in parallel, and determining the present offset values for the high-side path and the low-side path.

Using the high-side path and the low-side path in parallel and determining the present offset values allows the type of error to be determined and/or the error to be located. The acquisition and conversion of the WSS signal by means of an analog-to-digital converter (ADC) is characteristic of non-invasive measurement methods. After the WSS signal has been suitably conditioned (e.g. low-pass filtering), it may converted into a digital waveform with sufficiently accurate resolution using an ADC (connected to the positive supply=high side or the negative supply=low side, depending on the circuit architecture) or optionally using two ADCs (connected to the high side and the low side). Signal properties are examined by processing the digitized WSS signal values.

In a development, the determined offset values for the high-side path and the low-side path are constructively overlaid, thereby forming an improved vector. Two bits each having the same index from LVL_HS[x] and LVL_LS[x] are considered for this overlaying. The output bit LVL[x] is set to 1 if LVL_HS[x] or LVL_LS[x] exhibit a rising signal edge. The output bit LVL[x] is set to 0 if LVL_HS[x] or LVL_LS [x] exhibit a falling signal edge.

This ensures that an evaluation path that detects the signal edge first is sufficient for signal detection in the event of an error.

Offset compensation may be first carried out separately for the high-side path and the low-side path and then the two partial results are overlaid.

In a development a hysteresis is additionally implemented at the individual detection thresholds, which further improves robustness.

In a further development the threshold values are defined between the specific signal levels of the sensors.

The object is also achieved by an offset compensation device for compensating for offsets in sensor signals, wherein the offset compensation device has a shift register and an averaging unit. The offset compensation device carries out at least parts of the previously described method.

Furthermore, the object is achieved by a sensor device comprising the offset compensation device, the evaluation device and at least one sensor. In a development, the sensor is a wheel speed sensor for an electric braking system. The sensor device is designed to perform the previously described method.

BRIEF DESCRIPTION OF THE DRAWINGS

Further preferred embodiments result from the subclaims and the description of exemplary embodiments on the basis of figures that follows.

In the drawings, in a schematic representation.

DETAILED DESCRIPTION

An algorithm for determining and calibrating offsets in WSS signals is described, within the context of a non-invasive measurement method.

Figure 1:
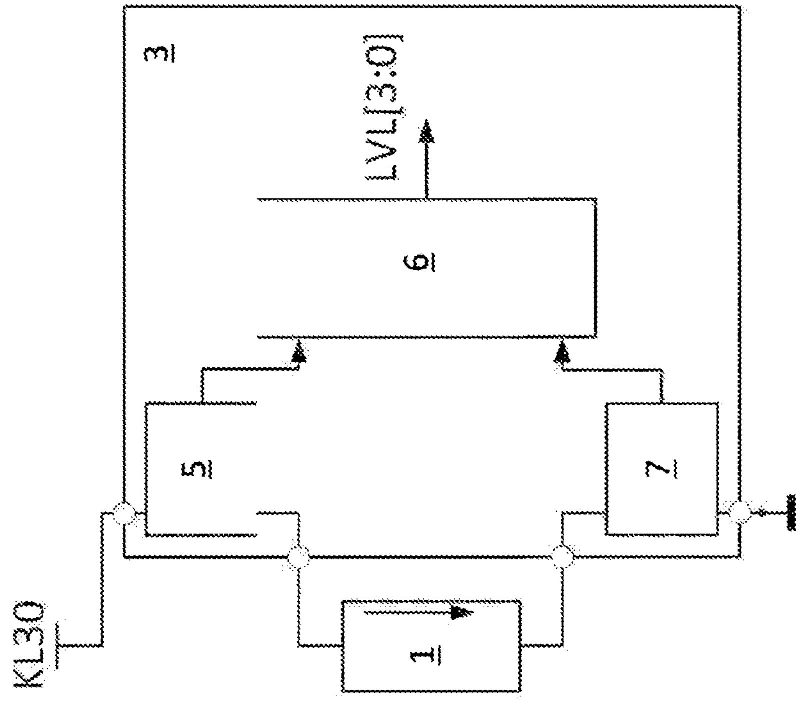
Fig. 1 (Prior art)
FIG. 1 shows the connection of a wheel speed sensor in the vehicle and the evaluation circuit (prior art)

Many sensors in the motor vehicle are connected to evaluation electronics via the wiring harness. FIG. 1 basically shows the connection of a wheel speed sensor 1 in the vehicle to an evaluation circuit 3, which has evaluation logic 4. The sensor 1 is supplied with voltage by way of the evaluation circuit (the evaluation IC) 3 by way of the connection to a power supply KL30. The sensor current flows through both a high-side driver (HS) 5 and a low-side driver (LS) 7 in the evaluation ASIC 3. During operation, the sensor 1 modulates the sensor current. This current can be measured and evaluated in the integrated circuit (evaluation circuit 3) using the high-side analog-to-digital converter (HS ADC) 9 and/or the low-side analog-to-digital converter (LS ADC) 11 (see FIGS. 3 and 5).

Figure 2:
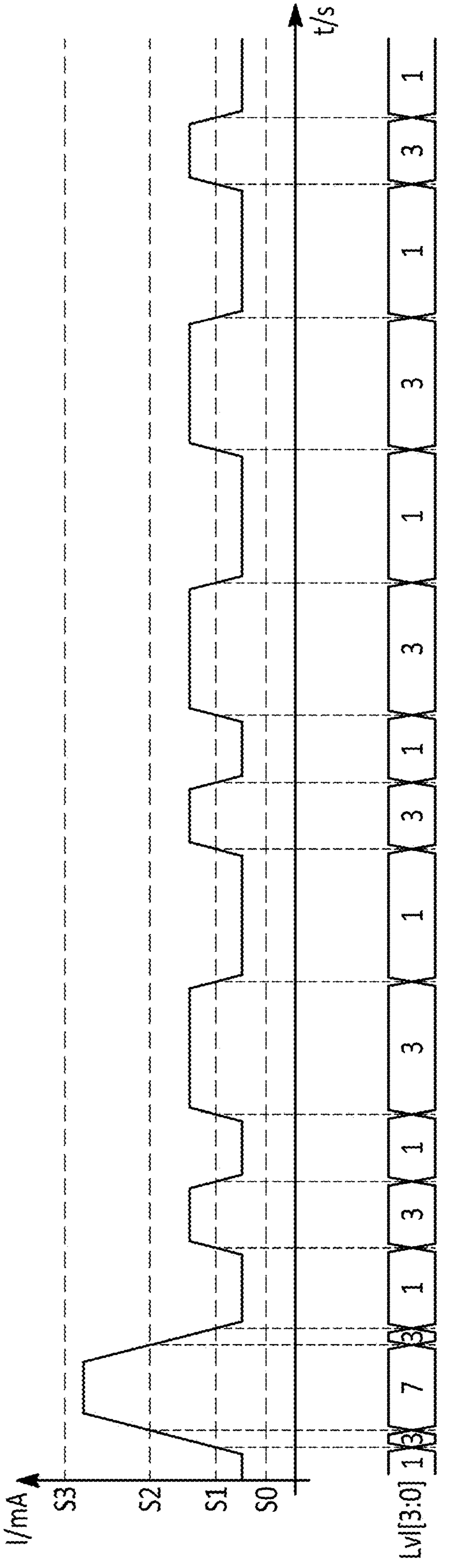
(Prior Art) Fig. 2
FIG. 2 shows the current curve of a wheel sensor with a protocol having three different current levels (prior art)

Different data protocols are used for the wheel sensors in the motor vehicle. These data are transmitted from the wheels to the electronic control unit via a current interface in the vehicle. FIG. 2 shows the current curve of the wheel sensor 1 with a protocol having three different current levels. Furthermore, four threshold values S0, S1, S2, S3 are shown in FIG. 2.

Figure 3:
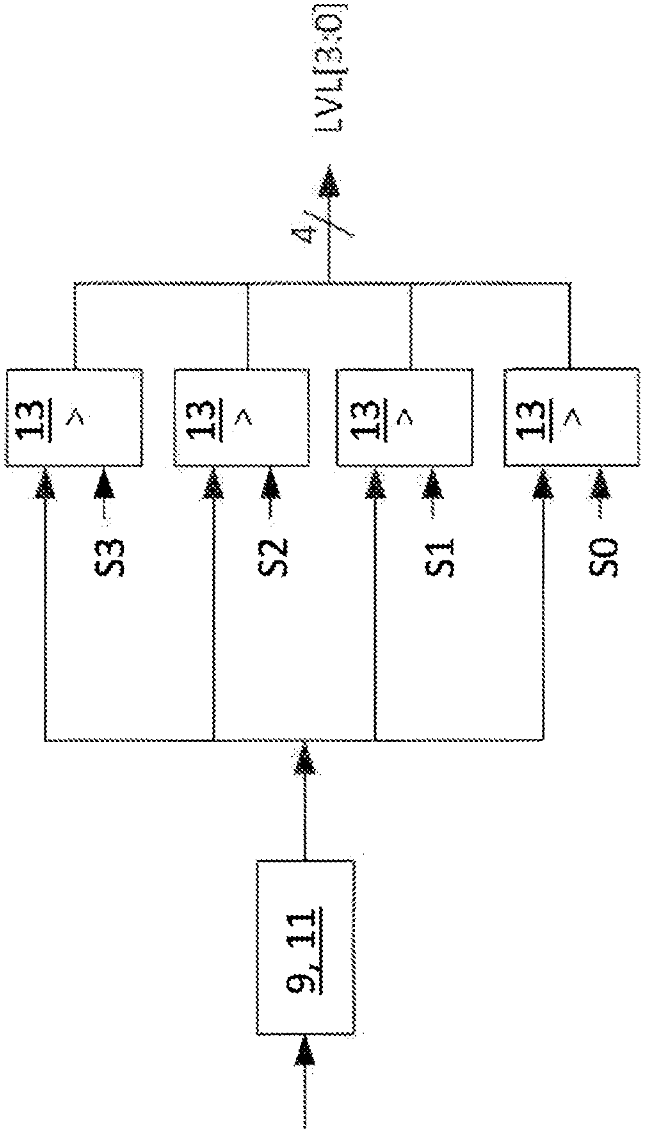
Fig. 3 (Prior art)
FIG. 3 shows a schematic diagram of the evaluation circuit (prior art)

FIG. 3 shows a schematic diagram of the evaluation circuit 3. The wheel sensor signal is first digitally converted using an analog-to-digital converter (ADC) 9, 11 and the result is compared with different threshold values S0 to S3. The threshold values SO to S3 are chosen such that they lie between the specified signal levels of the sensors 1. Each comparator 13 sets the digital output to 1 as soon as the value of the ADC 9, 11 is greater than the examined threshold S0-S3. If all the output signals of these comparators are combined into a digital signal vector, the vector LVL[3:0] is obtained, which is used for further signal detection. See in this regard also FIGS. 1 and 2, where the vector is also shown.

However, there may be a series of sensor errors during vehicle operation: offset errors in the positive and negative directions and amplitude errors (sensor amplitude too high or too low)

Figure 4:
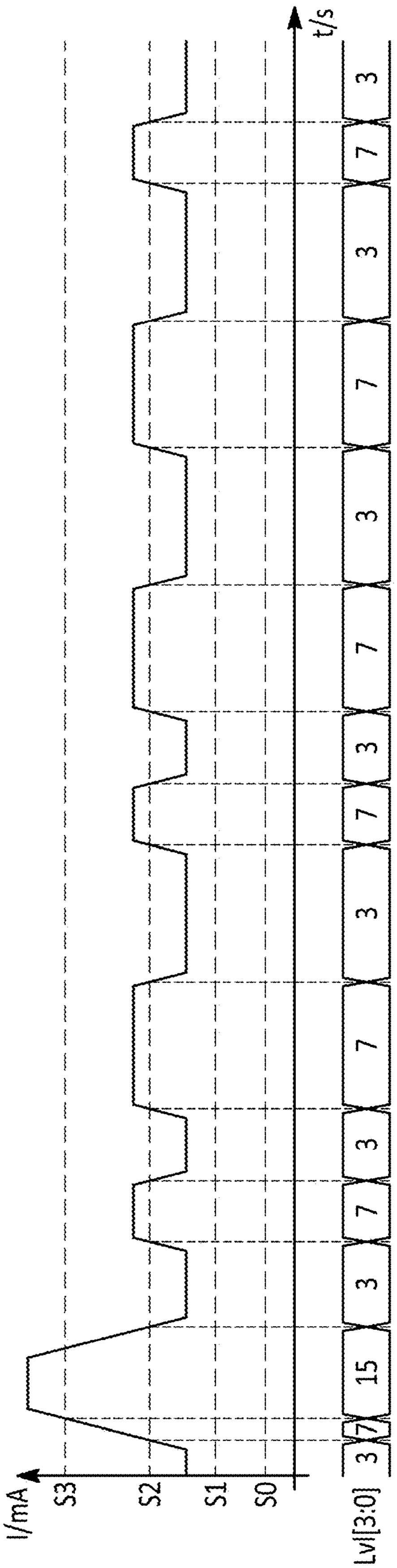
(Prior Art) Fig. 4
FIG. 4 shows the current curve of a wheel sensor as in FIG. 2, but with an offset error (prior art)

FIG. 4 shows the signal curve for a sensor 1 in the case of which all current levels are provided about a fixed absolute value. This error is referred to as an offset error.

The signal detection for forming the vector LVL[3:0] fails because the sensor signal is no longer below the threshold S1. In addition, threshold S3 is exceeded, which is not intended for correct protocol detection for the sensor 1. In this case, the sensor signal in the vehicle is lost and is no longer available for control functions in safety-critical control units. However, it can be seen in FIG. 4 that the sensor information is still held completely in the receive signal; only the detection range is shifted.

The detection method that follows, an offset compensation, allows signal detection even if sensor errors exist, in order to achieve increased availability for the wheel sensor signals in the vehicle. First, only one of the two detection paths, e.g. the high-side path 5, is considered.

Figure 5:
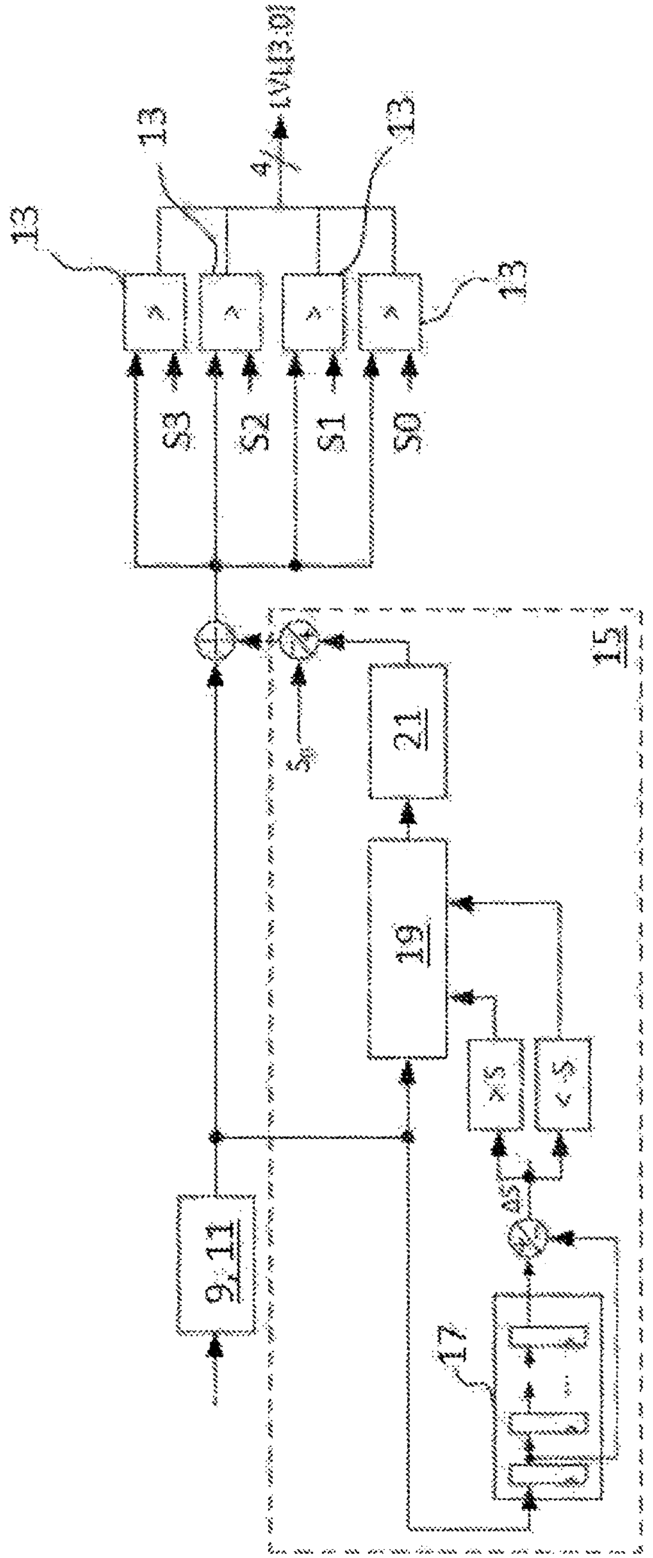
FIG. 5 shows the evaluation circuit as in FIG. 3, but with an additional block for the offset compensation.

As shown in FIG. 5, an additional block 15 for offset compensation is introduced into the evaluation circuit 3. A shift register 17 of length N stores the AD converter values. The length N of the shift register 17 is chosen such that at least all samples of an edge can be stored and N>2.

A difference AS is calculated from the first and last elements of the shift register 17. If the difference at the output of the shift register 17 is positive and greater than an edge steepness value (threshold value) S, this indicates a rising edge; if it is negative and less than an edge steepness value (threshold value) −S, a falling edge is detected.

Figures 6, 6A, 6B, 6C:
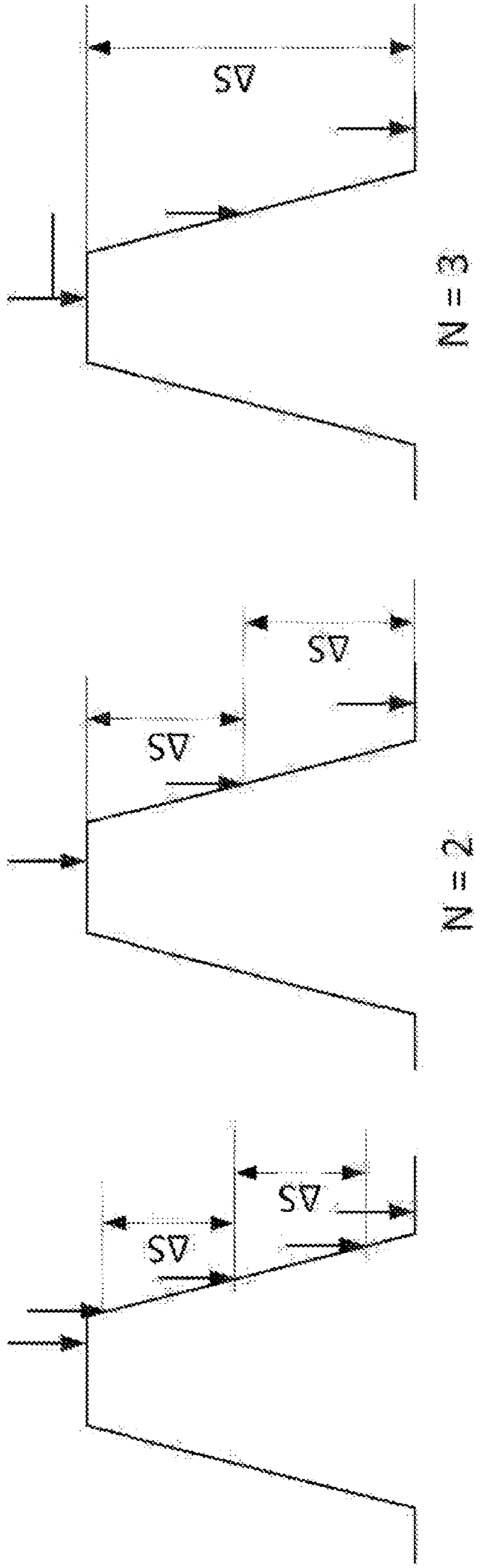
FIG. 6 shows an example study of the influence of the sampling rate of the ADC and the shift register length N for a falling edge.

The definition of the length N of the shift register 17 is explained with reference to FIG. 6*a-c*. In FIGS. 6*a* to 6*c*, the influence of the sampling rate of the ADC and of the shift register length N is examined for a falling edge.

In FIG. 6*a*, N=2 and the sampling rate relative to the edge steepness is high. The sampling times are indicated by arrows in the signal curve. In this case, the value ΔS becomes smaller the higher the sampling rate of the ADC 9, 11 rises. The higher the sampling rate, the longer the shift register 17 should be chosen to be.

A lower sampling rate has been used in FIG. 6*b*. The temporal correlation between the sensor signal and the sampling times is unknown or random, however. In this case, the signal may be sampled exactly in the middle of the edge. This causes ΔS to be at most half the magnitude of the signal amplitude.

FIG. 6*c* now shows the case where N=3. The sampling rate is chosen such that the entire edge can occur between two sampling values. Although the signal and sampling times are still uncorrelated, this guarantees that the amplitude ΔS corresponds to the signal amplitude. This is the best possible result and the reason for the introduction of the shift register 17.

In addition to the shift register 17, an averaging unit 19 is implemented for the AD converter values (see FIG. 5). This averaging unit 19 does not run continuously, but rather is controlled by the shift register output. If the output difference is greater than a threshold S, averaging is started. If the output difference is less than a threshold −S, averaging is stopped. If averaging is successfully terminated after exactly M input elements, the result is transferred to the next low-pass filter 21, the output of which produces the lowest level in the signal curve.

Together with the shift register, this results in the following response in the system: If the input signal from the ADC is constant, the shift register 17 is filled with almost identical values; the difference calculation at the output results in neither of the two thresholds S or −S being exceeded or undershot and the status of the averaging unit 19 does not change.

If the input signal has a falling edge, the shift register 17 is first filled with larger values and then with smaller values. The difference at the output is at the maximum as soon as the entire edge is stored in the shift register 17. During a falling edge, the threshold S may be exceeded multiple times. In this case, the averaging unit 19 is restarted each time and all previous partial results are discarded. Only at the end of the falling edge is the threshold S no longer exceeded and the averaging continues. This ensures that the averaging begins only at the end of a falling edge. Thus, it is not necessary to know when an edge begins or ends. The end of the edge is found automatically, as the averaging unit 19 is no longer interrupted.

If no further edge (falling or rising) is detected during the averaging, the averaging of M values is terminated and the result is transferred to the next low-pass filter 21. However, if a rising edge occurs during the operation, the shift register 17 is first filled with lower values and then with higher values. In this case, the threshold −S is undershot and the averaging is immediately terminated. All intermediate results are discarded and nothing is transferred to the low-pass filter 21.

This method ensures that the averaging starts and is performed exactly at the end of a falling edge, provided that the input signal does not change again afterward. The next low-pass filter 21 is implemented to mitigate the influence of a single averaging. If the averaging is carried out successfully multiple times, the output of the low-pass filter 21 delivers the value of the lowest signal level.

If a difference is calculated using the expected level for the lowest threshold of the sensor 1, the variance of the sensor signal from this expected value is obtained. This variance is used for correcting the AD converter values for the sensor evaluation. The sensor evaluation therefore also functions when an offset error exists.

The discovered offset error is additionally used as a monitoring parameter for the software. If the value becomes too great, the system software can react thereto and inform the driver or workshop of the error.

The following general conditions must be observed when designing the averaging unit:

The longer the value M of the averaging unit 19 is chosen to be, the more robust and accurate the determined result. On the other hand, however, the available waveform must also be considered. In the case of the sensor protocol in FIG. 2, it is possible to decide whether the averaging unit 19 is chosen to be so short that the averaging is also completed multiple times during a protocol. In this case, as few transmitted protocols as possible are lost, as the correction value can appear much more quickly.

If the averaging is chosen to be longer than the phases having the lowest level in the protocol, the averaging can take place only after the protocol. In this case, it will take longer for the correct correction value to be computed. Both implementations are possible.

Figure 7:
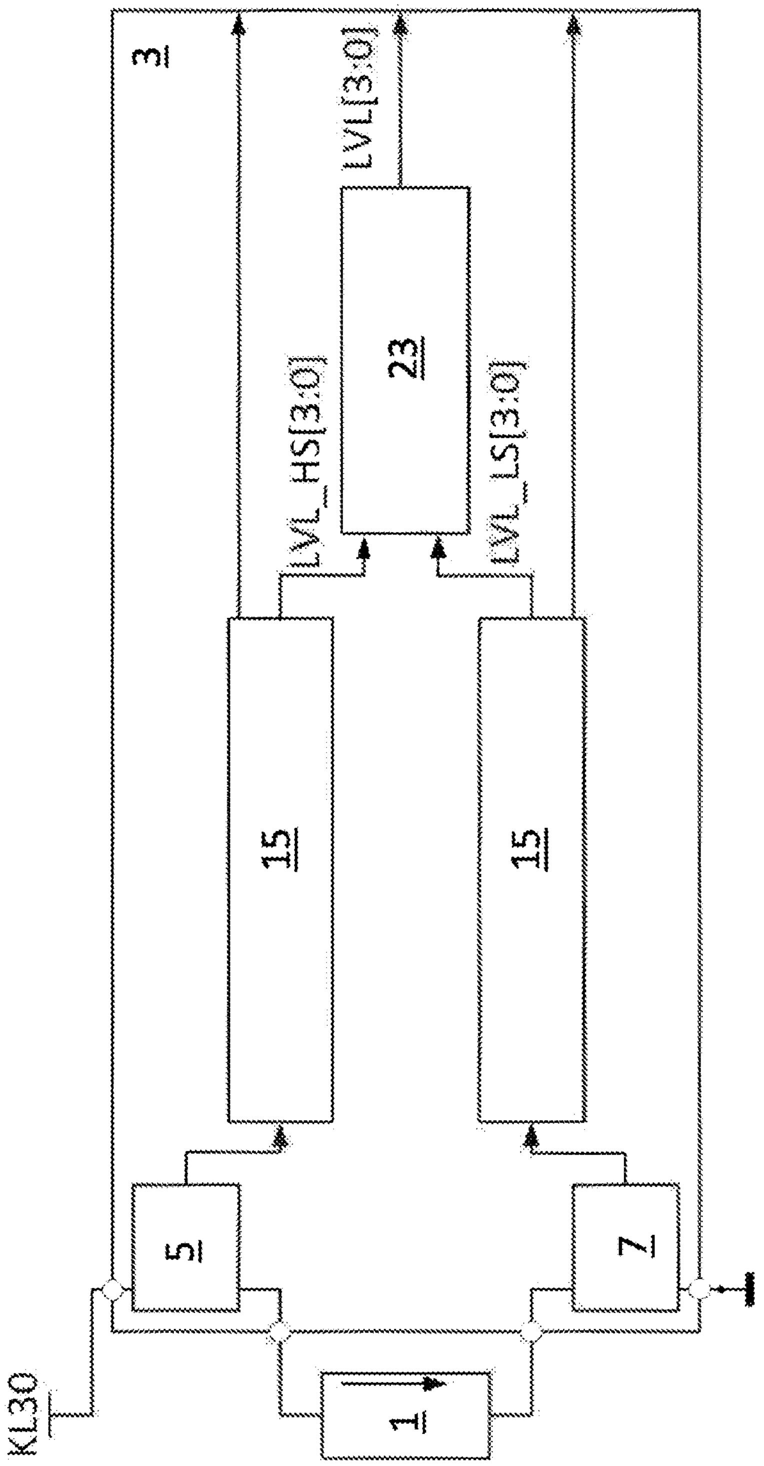
FIG. 7 shows the evaluation circuit in the case of parallel use of the HS and LS paths.

If, as shown in FIG. 7, the high-side and low-side paths 5, 7 are used in parallel in the evaluation IC 3, the currently determined offset value for the high-side or low-side path 5, 7 is obtained continuously during operation. These values can be used to determine the type of error and the location. In addition, it is possible to constructively overlay the determined data LVL_HS and LVL_LS, with the result that an improved vector LVL is formed. The overlaying can take place in an overlay unit 23.

Two bits each having the same index from LVL_HS[x] and LVL_LS[x] are considered for this overlaying. The output bit LVL[x] is set to 1 if LVL_HS[x] or LVL_LS[x] exhibit a rising signal edge. The output bit LVL[x] is set to 0 if LVL_HS[x] or LVL_LS[x] exhibit a falling signal edge. This ensures that an evaluation path that detects the signal edge first is sufficient for signal detection in the event of an error. An additional hysteresis at the individual detection thresholds improves robustness further.

The invention claimed is:

1. A method for offset compensation for sensor signals comprising:

storing sensor values in a shift register, of an offset compensation device;

calculating a difference between a first element of the shift register and a last element of the shift register;

determining multiple mean values, which comprises;

starting averaging by an averaging unit if when the difference is greater than a threshold value; and stopping averaging by the averaging unit if when the difference is less than the threshold value;

determining a lowest signal level using a low-pass filter based on the mean values;

determining an offset by calculating another difference between the lowest signal level and a reference current value; and correcting the sensor values using the determined offset.

2. The method as claimed in claim 1, wherein a number for the shift register is chosen such that at least all samples of an edge can be stored and the number is greater than two.

3. The method as claimed in claim 1, further comprising selecting an averaging window of the averaging unit such that the averaging window is longer than phases having which have the lowest level in the protocol, with the result that the averaging takes place only after the protocol.

4. The method as claimed in claim 1, further comprising selecting an averaging window of the averaging unit such that the averaging window is shorter than phases which have the lowest level in the protocol, with the result that the averaging is completed multiple times during a protocol.

5. The method as claimed in claim 1, further comprising:

supplying at least one sensor with a voltage by way of an evaluation circuit;

modulating a sensor current by way of the sensor; and measuring and evaluating the sensor current by way of the evaluation circuit.

6. The method as claimed in claim 5, wherein the evaluation circuit has a high-side path and a low-side path and further comprising using the high-side path and the low-side path in parallel; and determining the present offset values for the high-side path and the low-side path.

7. The method as claimed in claim 6, further comprising constructively overlaying the determined offset values for the high-side path and the low-side path and forming a vector.

8. An offset compensation device for compensating for offsets in sensor signals comprising:

a shift register for storing sensor values and calculating a difference between a first element of the shift register and a last element of the shift register;

an averaging unit which starts averaging when the difference is greater than a threshold value;

and stops averaging when the difference is less than the threshold value; and wherein the offset compensation device determines a lowest signal level using a low-pass filter based on the mean values and determines an offset by calculating another difference between the lowest signal level and a reference current value; and corrects the sensor values using the determined offset.

9. A sensor device as claimed in claim 8, further comprising the offset compensation device, an evaluation device and at least one sensor.

10. The sensor device as claimed in claim 9, wherein the sensor is a wheel speed sensor for an electric braking system.

* * * * *